United States Patent
Garcia et al.

(10) Patent No.: US 12,297,050 B2
(45) Date of Patent: May 13, 2025

(54) SYSTEM FOR STORING, TRANSPORTING AND DISPENSING WET SAND TO A HYDRAULIC FRACTURING OPERATION AT A WELL SITE

(71) Applicant: SANDBOX ENTERPRISES, LLC, Katy, TX (US)

(72) Inventors: George Garcia, Katy, TX (US); Casey Taylor, Katy, TX (US); Derek Ussery, Katy, TX (US); Chad Trueheart, Katy, TX (US)

(73) Assignee: SANDBOX ENTERPRISES, LLC, Katy, TX (US)

( * ) Notice: Subject to any disclaimer, the term of this patent is extended or adjusted under 35 U.S.C. 154(b) by 210 days.

(21) Appl. No.: 18/078,733

(22) Filed: Dec. 9, 2022

(65) Prior Publication Data

US 2023/0183022 A1    Jun. 15, 2023

Related U.S. Application Data

(60) Provisional application No. 63/268,277, filed on Feb. 20, 2022, provisional application No. 63/265,253, filed on Dec. 10, 2021.

(51) Int. Cl.
   *B65G 47/19*    (2006.01)
   *B65D 88/54*    (2006.01)
   (Continued)

(52) U.S. Cl.
   CPC ........... *B65G 47/19* (2013.01); *B65D 88/546* (2013.01); *B65G 3/04* (2013.01); *B65G 41/003* (2013.01); *B65G 47/82* (2013.01); *E21B 43/2607* (2020.05)

(58) Field of Classification Search
   CPC ........ B65G 69/08; B65G 47/18; B65G 11/08; B65G 65/40; B65G 15/30; B65G 47/44;
   (Continued)

(56) References Cited

U.S. PATENT DOCUMENTS

| 5,769,281 A | 6/1998 | Bates |
| 9,340,353 B2 | 5/2016 | Oren et al. |

(Continued)

FOREIGN PATENT DOCUMENTS

| CN | 203540892 U | * 4/2014 | ............... B07B 1/28 |
| CN | 205802254 U | * 12/2016 | ............. B65G 69/18 |

(Continued)

OTHER PUBLICATIONS

International Search Report and Written Opinion issued Apr. 20, 2023, in corresponding International Application No. PCT/US2022/052414 (15 pages).

*Primary Examiner* — James R Bidwell
(74) *Attorney, Agent, or Firm* — Osha Bergman Watanabe & Burton LLP

(57) ABSTRACT

Described is a system for conveying wet sand. The system includes containers with a slip coating for storing wet sand. Each container includes an outlet formed in a bottom portion to facilitate removal of the wet sand from the container to a hopper. Each hopper has end walls, side walls, and an interior wall extending at an angle from the top to the bottom of the hopper to reduce an area of the outlet. A flow gate over the outlet controls discharge of the wet sand from the hopper onto a conveyor belt of a conveyor system. The hopper also includes a vibration system coupled to its exterior surface for shaking the hopper to assist in releasing sand. A discharge assembly is located at the end of the conveyor system for directing wet sand from the conveyor belt.

21 Claims, 14 Drawing Sheets

(51) Int. Cl.
  *B65G 3/04* (2006.01)
  *B65G 41/00* (2006.01)
  *B65G 47/82* (2006.01)
  *E21B 43/26* (2006.01)

(58) Field of Classification Search
  CPC ........ B65G 11/12; B65G 47/19; B65G 47/82;
     B65D 88/546; B65D 90/02; B65D 88/26;
     E21B 43/2607
  See application file for complete search history.

(56) References Cited

U.S. PATENT DOCUMENTS

| | | |
|---|---|---|
| 9,421,899 B2 | 8/2016 | Oren |
| 9,771,224 B2 | 9/2017 | Oren et al. |
| 9,809,381 B2 | 11/2017 | Oren et al. |
| 9,815,620 B2 | 11/2017 | Oren et al. |
| 10,464,741 B2 | 11/2019 | Oren et al. |
| 11,643,287 B2 * | 5/2023 | Dawson ............... B65G 65/005 414/222.01 |
| 2007/0238565 A1 | 10/2007 | Marler |
| 2015/0290609 A1 | 10/2015 | Naizer et al. |
| 2015/0360856 A1 | 12/2015 | Oren et al. |
| 2020/0048985 A1 * | 2/2020 | Oehler ................... B65G 27/16 |
| 2020/0068814 A1 * | 3/2020 | McGloin ................ B65G 65/44 |
| 2021/0013008 A1 | 1/2021 | Hong et al. |
| 2021/0130113 A1 | 5/2021 | Shepherd |

FOREIGN PATENT DOCUMENTS

| | | | | |
|---|---|---|---|---|
| CN | 207290532 U | * | 5/2018 | ............... B28C 7/06 |
| CN | 212121575 U | * | 12/2020 | ............... B22C 5/08 |
| EP | 2794435 B1 | | 4/2016 | |

\* cited by examiner

SYSTEM FOR STORING, TRANSPORTING AND DISPENSING WET SAND TO A HYDRAULIC FRACTURING OPERATION AT A WELL SITE

BACKGROUND

Hydraulic fracturing is the propagation of fractions in a rock layer caused by the presence of pressurized fluid. Hydraulic fractures may form naturally, in the case of veins or dikes, or may be man-made in order to release fossil fuels, for example petroleum, natural gas, coal seam gas, or other substances, for extraction. Fracturing is done from a wellbore drilled into reservoir rock formations. The energy from the injection of a highly-pressurized fracking fluid creates new channels in the rock which can increase the extraction rates and ultimate recovery of fossil fuels. The fracture width is typically maintained after the injection by introducing a proppant into the injected fluid. Proppant is a material, such as grains of sand, ceramic, or other particulates, that prevents the fractures from closing when the injection is stopped.

Conventionally, a processed silica sand is used in hydraulic fracturing operations to provide the desired proppant characteristics (i.e., shape, grain size, and moisture content). Such processing, which typically includes drying and grading of the sand, is performed at or near the mining site and requires significant resources in the form of equipment and utilities. As a result, there is a significant addition to the cost and timing to store, transport and dispense proppant to a hydraulic fracturing operation at a well site from the mining site.

Over the past decade, Applicant has developed various systems and methods to advance the logistics for delivering the quantities of proppant from sand mines to the well site, which facilitate the ability to store proppant quickly and inexpensively in containerized units specifically configured for loading, transporting and off-loading on a variety of transportation vehicles. These systems and methods further include various material handling and conveyor systems for emptying the containerized units and dispensing the proppant to the well site.

Applicant has recently been looking for means to further improve the logistics and reduce the cost associated with supplying proppant in the hydraulic fracturing operation. Such efforts have been focused on reducing or eliminating the post-mining processes, in particular certain drying operations, so that sand may be used directly from the mining operation. In this context, the term "wet sand" or "dirty sand" has been used to refer to a less processed sand. These efforts have not been without difficulties in the logistics for storing, transporting, and dispensing wet sand. The higher moisture content of the sand changes the weight, packing characteristics and fluidity of the proppant. As a result, there is a need to improve the containerized units, and material handling/conveyor systems used for storing, transporting, and dispensing wet sand to a hydraulic fracturing operation at a well site.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the present disclosure provides containerized units (or simply containers) for storing and transporting wet sand. In another aspect, the present disclosure provides material handling/conveyor systems for dispensing wet sand. These embodiments represent improvements to the system and components previous developed by Applicant, for example as disclosed in one or more of the following patents or published applications: U.S. Pat. Nos. 9,340,353; 9,421,899; 9,771,224; 9,809,381, 9,815,620; 10,464,741; US 2021/013008 and US 2021/0130113. The disclosure of each of these patents and published applications are expressly incorporated by reference herein.

In one embodiment, a friction-reducing layer (or simply slip coating) is provided on the interior surfaces of containers and the hoppers and chutes of the material handling/conveyor system for encouraging sand to move through these components and for preventing deterioration of the metal structure of these components by resisting water and withstanding moisture in the wet sand. The slip coating may be applied in a variety of ways. For example, the slip coating may be a flexible sheet product that is secured to the various interior surfaces with mechanical fasteners, adhesives, or a combination of these securing means. Alternately, a liquid form of the slip coating may be applied by any suitable manner (e.g., spraying, brushing, dipping, anodizing, etc.)

In another embodiment, the top and hatch of the container on a conventional container may be eliminated to increase the inlet area for the container. In other words, the upper portion of the container terminates at the side walls with no horizontal top or door enclosing the interior value of the container. The container may be configured with a retractable tarp mechanism or removable lid when transporting the container.

In another embodiment, the discharge region of the hopper assembly is configured to effectively dispense wet sand therefrom. In particular, a simple outlet without any grate or screen is formed in the conveyor hopper and a flow gate is configured over the outlet. The outlet area is reduced by about 60% when compared with a conventional hopper outlet. The flow gate is movable with an actuator in a direction parallel to the conveyor belt travel path for precisely controlling the discharge of wet sand from the container onto the belt.

In another embodiment, a vibration mechanism is provided on a stationary component of the system such as a conveyor hopper. In particular, one or more vibration system(s) is coupled to an exterior surface of the hopper assembly and operates to shake the hopper assembly for breaking up larger sand masses and minimizing bridging above the outlet and the flow gate.

In another embodiment, the conveyor belt is reinforced for handling a heavier product owing to the added moisture in the sand and is also configured to eliminate sand sticking on the belt at the turning over point (i.e., the discharge end) of the conveyor. In particular, a suitable conveyor belt for transporting wet sand includes a corrugated central rib extending from the belt surface between the corrugated side walls of the belt. The height of the central rib may be shorter than the corrugated side walls. In addition, the partitions extending up from the belt surface have a lower profile as compared to a conventional belt.

In another embodiment, the conveyor belt includes corrugated side walls having alternate ridges and grooves. Furthermore, the conveyor belt includes a plurality of tubular projections extending from the belt surface between the corrugated side walls. In another embodiment, the length of the shrouded portion of the conveyor may be extended along with the length of the conveyor so that the discharge point of the conveyor is positioned higher above the ground then a conventional conveyor system. Likewise, the conveyor support structure may be equipped with a hydraulic lifting mechanism for increasing the height of the conveyor assembly above the ground. In this way, the outlet of the conveyor system can be located at various elevations to accommodate different equipment and configurations at the well site.

In another embodiment, a discharge assembly is located at the end of the conveyor for directing wet sand from the conveyor belt into a blender tub. The discharge assembly includes a chute located directly adjacent to the turnover point of the conveyor and a dragon tail extending from the chute to an outlet for dispensing wet sand into the blender tub. The chute includes a fixed section secured to the conveyor support structure and a hinged section pivotally coupled to the fixed section for adjusting the pitch of the discharge assembly. The dragon tail is coupled to the chute by a first mechanism that provides relative pitching movement of the dragon tail with respect to the chute and a second mechanism that provides yawing movement of the dragon tail relative to the chute.

In another embodiment, the material handling/conveyor system includes an on-board power unit for supplying electrical power and hydraulic power to the various motors, actuators, sensors, controllers, cameras, etc. The on-board power unit has a diesel engine operably coupled to hydraulic pump(s) and electrical alternator(s). Optionally, an off-board (i.e., separate) power unit may be configured on a portable skid that can be located adjacent to the on-board power unit, which is then plumbed and wired into the material handling/conveyor system a redundant or replacement power unit.

In another embodiment, the material handling/conveyor system includes a motor-brake mechanism for precisely controlling movement of the conveyor belt. The motor is operational in a forward mode for advancing the conveyor belt in a direction to convey wet sand to the discharge assembly, a neutral mode for allowing the conveyor belt to free wheel and a reverse mode for backing the conveyor belt in a direction away from the discharge assembly. In the neutral mode, a conveyor belt may roll for about 7-10 feet before coming to a stop. A braking system is used to stop the movement of the conveyor belt. The braking system includes a brake disk on the motor side of a drive shaft, a brake caliper on the conveyor support structure and a brake controller for activating the braking system. In one mode, the brake controller may a mechanical-hydraulic actuator controlled with an electric solenoid which is configured as a stop circuit for immediately stopping the conveyor belt. In response to a "stop belt" command, the brake controller shifts the motor into neutral mode and causes the caliper to engage the brake disk for immediately stopping the conveyor belt. The braking system may also be configured for use in a normal shut-down operation of the conveyor system.

In another embodiment, the control system for the material handling/conveyor system is configured to accurately transport wet sand from the containers into the blending hopper. In particular, the control system (for example, Lime Instruments Controller) operates flow gates on the container and the feed hoppers in combination with the conveyor belt speed based on the blender feed rate measured by a densometer located at the blender tub inlet. The densometer measures the specific gravity of blender feed, which can be used to determine the weight of the wet sand being feed into the blender tub. The weight of the wet sand in the container may be measured by a set of box scales on the conveyor structure and may also be used as a feedback parameter for controlling the slide gate on the container and/or the flow gate on the hopper. As an option, a moisture content sensor may be located along the belt to determine the moisture content of the wet sand discharged onto the conveyor belt.

In another embodiment, a vision subsystem may be configured on the material handling/conveyor system to visually monitor the state and operational status of the system. The vision subsystem includes a camera assembly including weatherproof cameras electrically coupled to the power supply system and configured to capture and wirelessly transmit live video from a low light scene to a remote display. The aspects defined above as well as further aspects, features and advantages of the present disclosure can be derived from the examples of the embodiments to be described hereinafter and are explained with reference to examples of embodiments also shown in the figures, but to which the invention is not limited.

Other aspects and advantages of the claimed subject matter will be apparent from the following description and the appended claims.

BRIEF DESCRIPTION OF DRAWINGS

The drawings described herein are for illustrative purposes only of selected embodiments and not all possible implementations and are not intended to limit the scope of the present disclosure.

Figure 1:
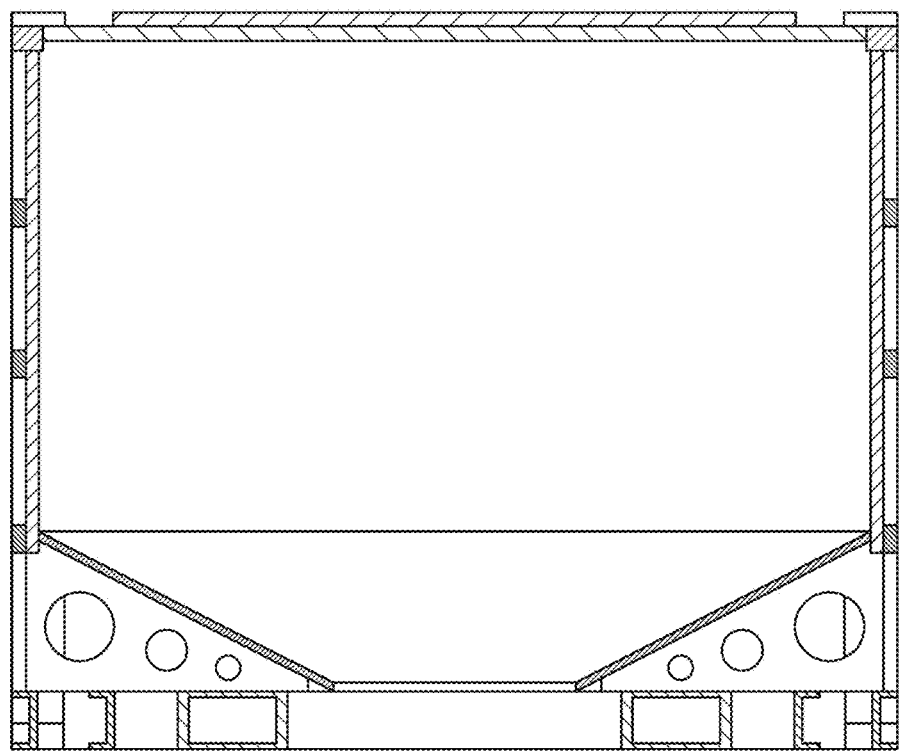
FIG. 1 shows a cutaway view of a storage container disclosed in U.S. Pat. No. 9,809,381.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures.

DETAILED DESCRIPTION

Figure 2:
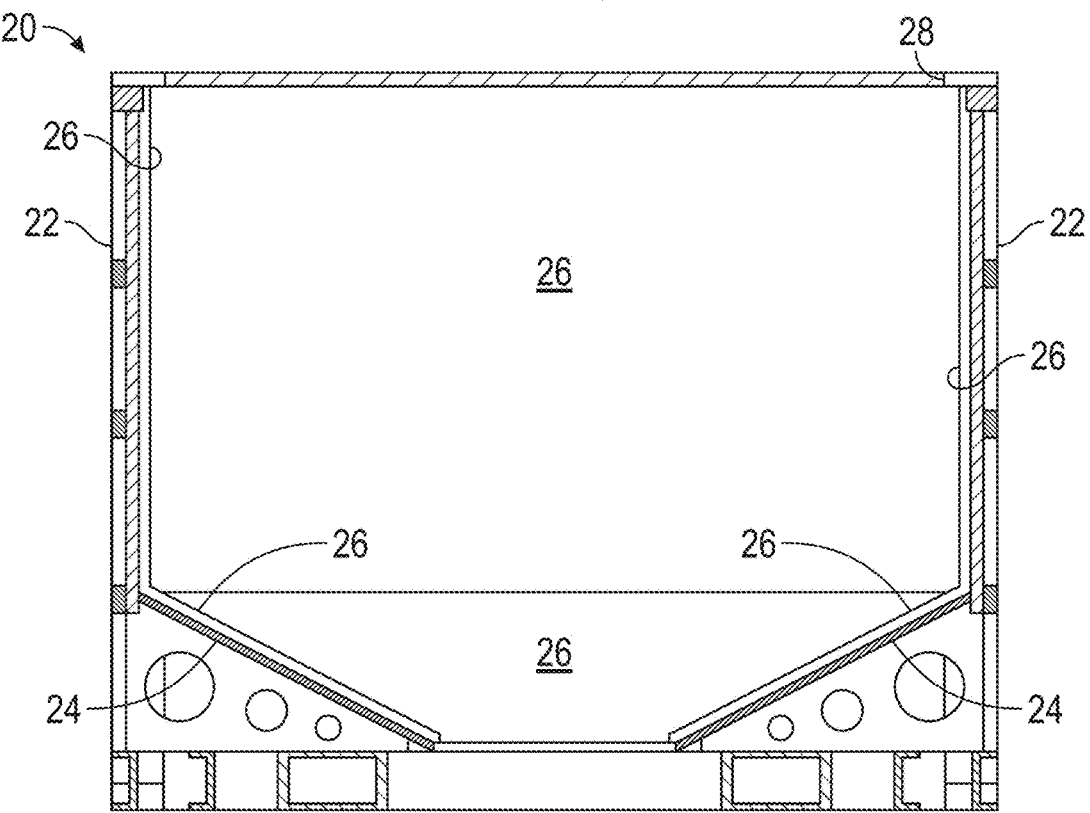
FIG. 2 shows a cutaway view of the storage container in accordance with the present disclosure having a slip coating applied to the interior surfaces thereof.

FIG. 1 illustrates an embodiment of a conventional proppant storage container 10. The container 20 shown in FIG. 2 is modified for storing, transporting, and dispensing wet sand. Each container includes an outlet formed in a bottom portion thereof to facilitate removal of the wet sand from the container to a hopper. In particular, the interior surfaces of the side walls 22 and tapered bottom walls 24 have a slip coating 26 formed thereon for encouraging sand to move through the container and for preventing deterioration of the metal structure thereof by resisting water and withstanding moisture in the wet sand. As shown in FIG. 2, the slip coating 26 is a flexible sheet product, for example an ultra-high molecular weight plastic sheeting, that is secured to the various interior surfaces with mechanical fasteners, adhesives, or a combination of those securing means. Alternately, a liquid form of the slip coating material may be applied to these interior surfaces by any suitable manner (e.g., spraying, brushing, dipping, or otherwise depositing). A large opening 28 is formed in the top of the container 20 and serves as an inlet to the interior of the container. In other words, the upper portion of the container terminates at the side walls 22 with no horizontal top or door enclosing the interior value of the container. The container may be configured with a retractable tarp mechanism or a removable lid for transporting and/or storing the container.

Figure 3:
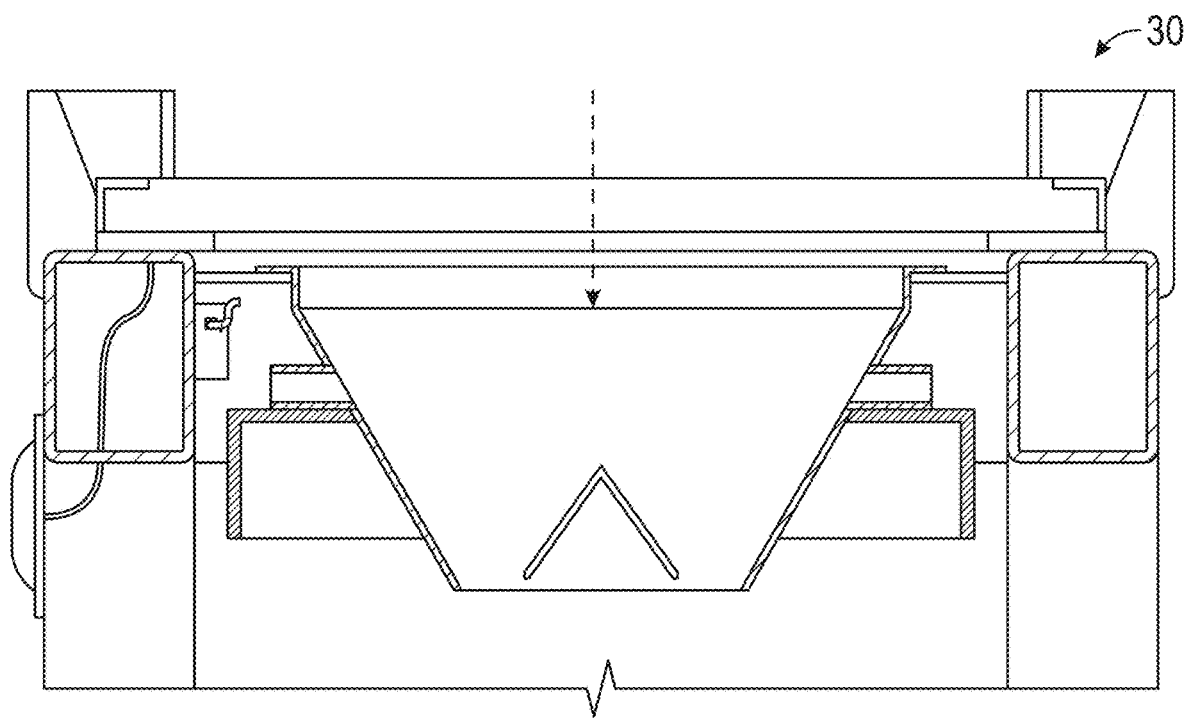
FIG. 3 shows a cutaway view of a hopper section for the conveyor system disclosed in U.S. Pat. No. 9,809,381.
Figure 4:
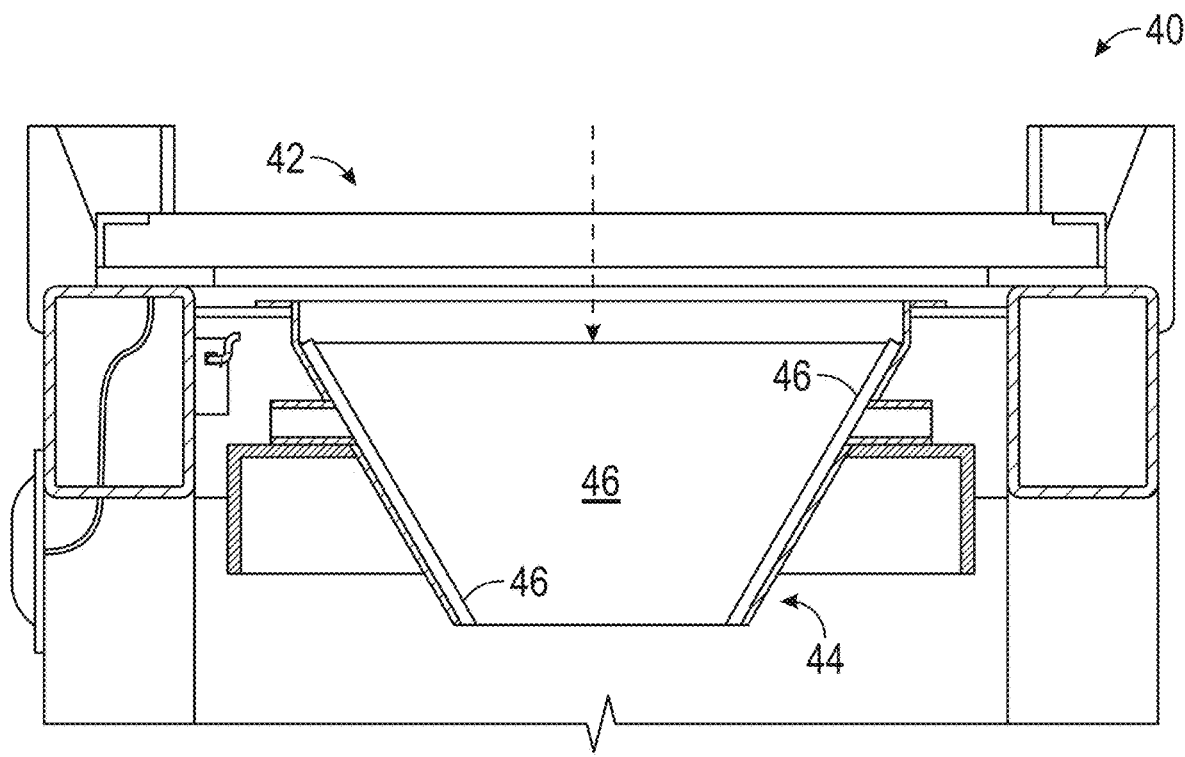
FIG. 4 shows a cutaway view of the hopper section in accordance with the present disclosure having a slip coating applied to the interior surfaces thereof.
Figure 5:
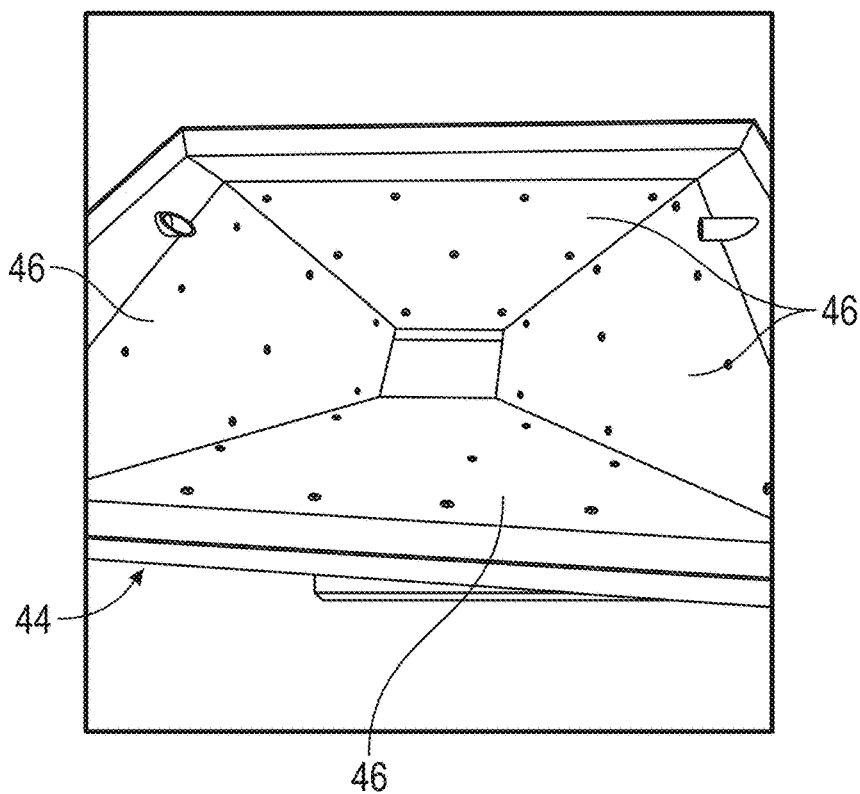
FIG. 5 is a perspective view of a hopper in accordance with the present disclosure having slip coating panels fastened to the interior surfaces thereof.

FIG. 3 illustrates an embodiment of a conventional material handling/conveyor system 30. The material handling/conveyor system 40 according to embodiments of this disclosure and shown in FIGS. 4-6 includes a hopper assembly 42 that is modified for transporting and dispensing wet send. The interior surfaces of the hopper 44 have a slip coating 46 formed thereon for encouraging sand to move through the container and for preventing deterioration of the metal structure thereof by resisting water and withstanding moisture in the wet sand. The slip coating 46 is a sheeting, for example an ultra-high molecular weight plastic sheeting, that is secured to the various interior surfaces with mechanical fasteners, adhesives, or a combination of those securing means. Alternately, a liquid form of the slip coating material may be applied to these interior surfaces by any suitable manner (e.g., spraying, brushing, dipping, or otherwise depositing).

Figure 10:
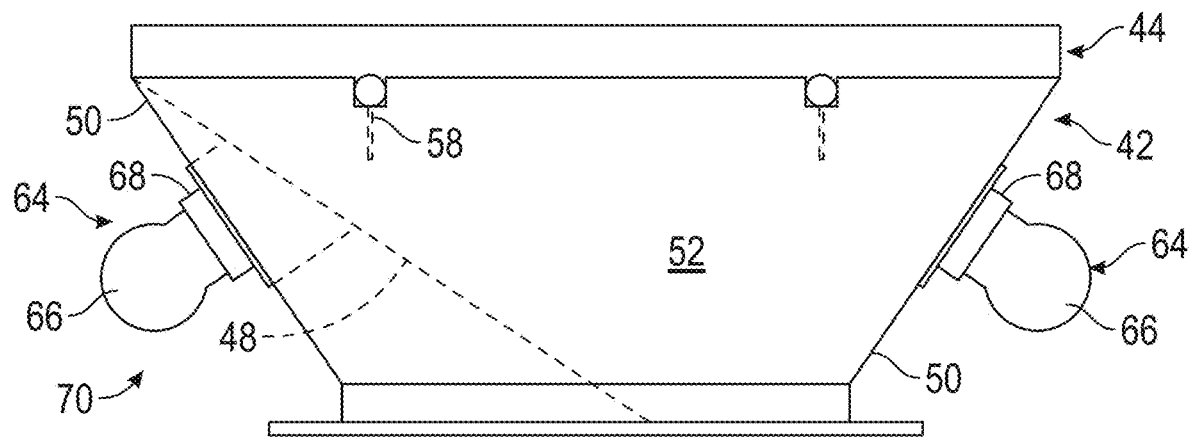
FIG. 10 is a side view of the hopper shown in FIGS. 7 and 8 in accordance with the present disclosure.

FIGS. 7-10 illustrate additional modifications to adapt the material handling/conveyor system 40, and more specifically the hopper assembly 42 for transporting and dispensing wet sand. In one aspect, the hopper 44 is reconfigured to reduce the outlet area. Hopper 44 includes a pair of end walls 50 (front and back) and a pair of side walls 52 (left side and right side) which form the hopper 44. An interior wall 48 extends from the top of the hopper 44 at a shallower angle than left wall 52, as best seen in FIG. 10. Such angle (from the horizontal plane) of interior wall 48 may be less than 90 degrees, such as from 20 degrees to less than 90 degrees, or a lower limit of any of 20, 30, or 40 degrees to an upper limit of any of 60, 75, or 90 degrees, where any lower limit can be used in combination with any upper limit. A flow gate 54 is provided at the outlet of hopper to control the discharge of wet sand through hopper from container onto a conveyor belt. The flow gate 54 is movable with an actuator (not shown), such as a hydraulic actuator, in a direction (A) parallel to the conveyor belt travel path for precisely controlling the discharge of wet sand from the container onto the conveyor belt. The hopper 44 is formed such that, during use, the flow gate 54 is centered directly under an outlet of the container above the hopper 44, such that sand falls directly from the container through the flow gate 54. In one or more embodiments, a width of the flow gate 54 is less than a width of the conveyor belt, such that as sand flows through the flow gate 54, it stays on the conveyor belt rather than spilling over the sides of the conveyor belt. In one or more embodiments, the distance between the flow gate 54 and the conveyor belt is between 0 inches and 3 inches. Due to the minimal distance, the flow gate 54 may contact the wet sand on the conveyor belt and act as a packing and leveling device for the wet sand on the conveyor belt.

Figure 6:
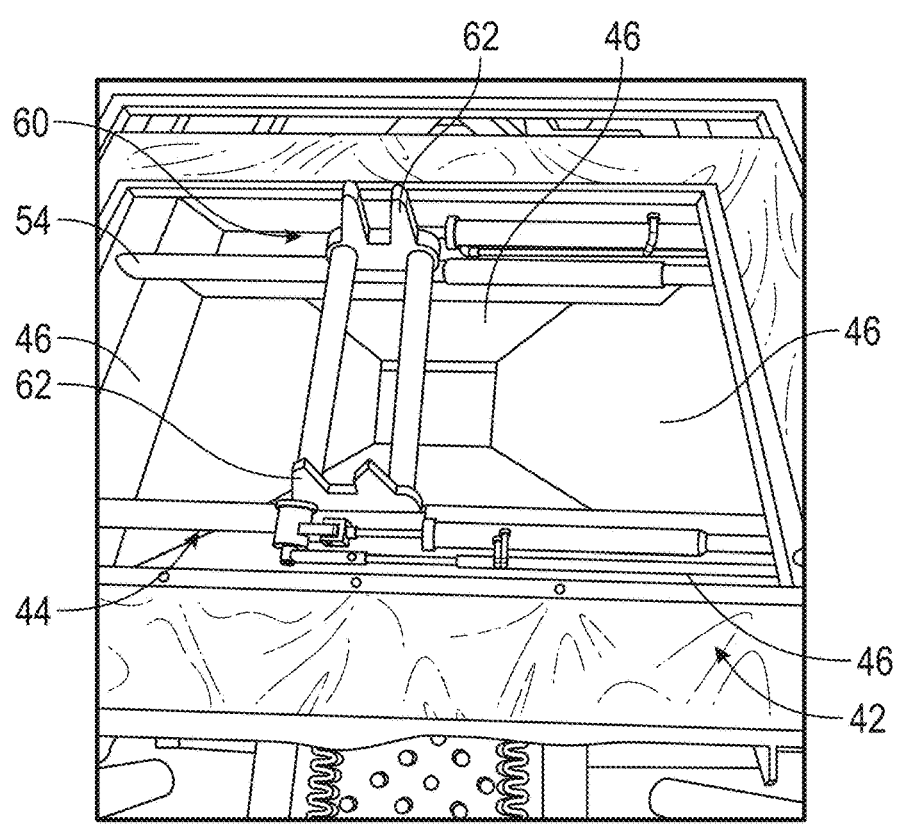
FIG. 6 is a perspective view of a hopper assembly, including the hopper shown in FIG. 5, and a slide gate actuator in accordance with the present disclosure.
Figure 7:
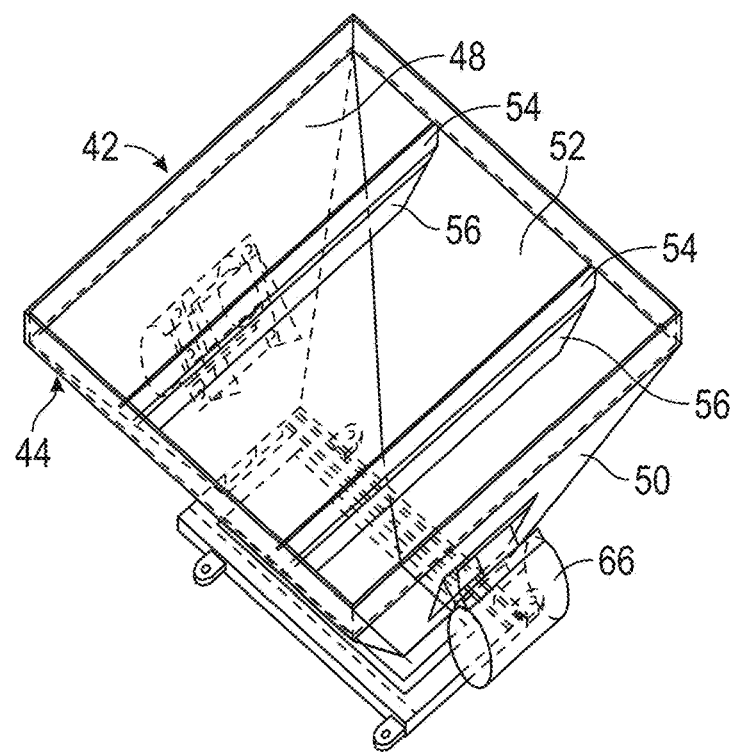
FIGS. 7 and 8 are perspective views of an embodiment of a hopper assembly in accordance with the present disclosure.
Figure 8:
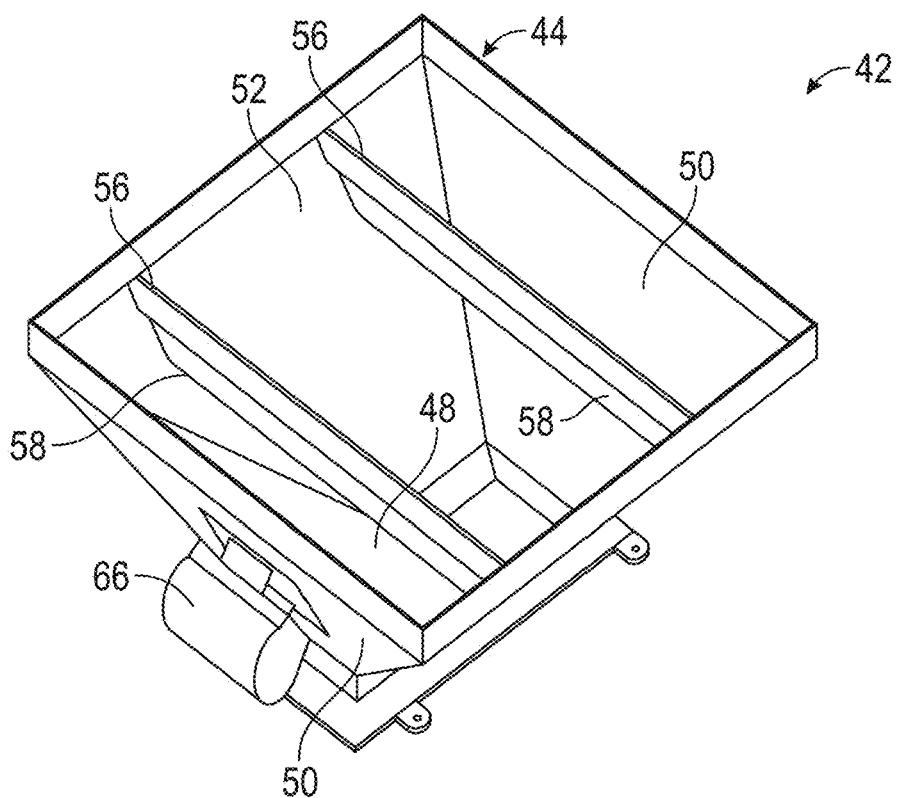
Figure 9:
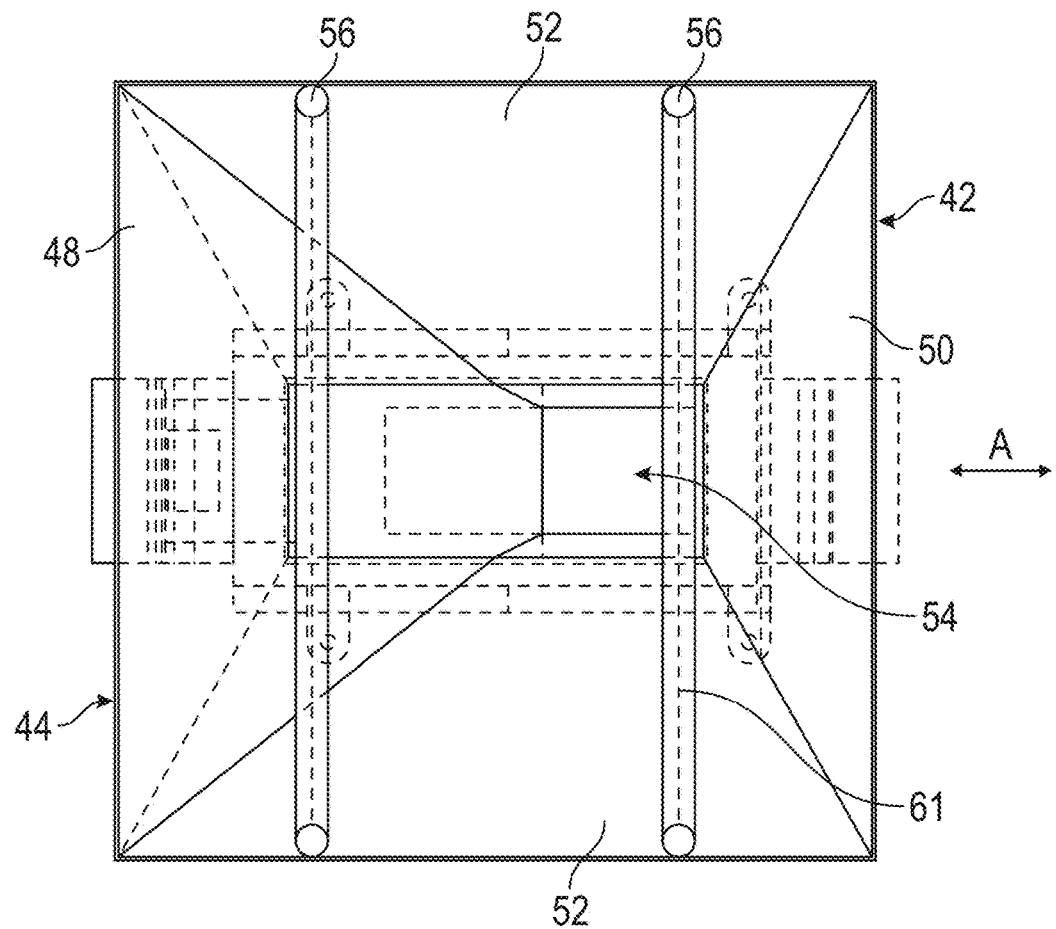
FIG. 9 is a top view of the hopper shown in FIGS. 7 and 8 in accordance with the present disclosure.

Upper supports 56 extend across the top of the hopper 44 between walls 50. Supporting elements, such as flat bars 58, are welded to the bottom of each upper support 56 to provide additional strength and stiffness. As shown in FIG. 6, a gate actuator mechanism 60 is supported on the upper supports 56 and has a pair of pickle forks 62 extending upwardly for engaging and selectively positioning a slide gate (not shown) on an adjacent container 20 positioned over the hopper assembly 42. Bump stops 61 may be installed on the pickle forks 62 so that gate actuator mechanism 60, such as a hydraulic actuator mechanism, is fully engaged with the slide gate when it is in the open position.

With continued reference to FIGS. 7-10, the hopper assembly 42 includes at least one, and optionally two, or more vibration systems 64. Each vibration system 64 includes a motor assembly 66 (i.e., a motor rotating an eccentric weight) to generate a shaking force (approximately 1200 pound-force (lbf)) that is transmitted to the hopper assembly 42 to assist in releasing and breaking up the wet sand. The motor 66 may be hydraulically driven or electrically driven. As shown, the motor 66 is coupled to a motor mount 68 that is secured to an end wall 50. In the case of the left end wall 50, bracing 70 extends between the end wall 50 and the interior wall 48 to reinforce the mounting structure for the motor assembly 66. When the gate actuator mechanism 60 is moved to open the slide gate, the bump stops 61 may also function to transmit some shaking forces from the hopper assembly 42 to the container 20. When the slide gate is in an opened position, the bump stops 61 installed on the pickle forks 62 may transfer vibration directly to the container 20 above the hopper assembly 42. The hopper assembly 42 is supported from the conveyor system 40 in a manner to isolate the vibration generated by the vibration mechanism(s) 64. For example, the hopper assembly 42 may be coupled using flexible (e.g., rubber) grommets at a bolted connection with the conveyor system 40. Alternatively, a spring suspension system may be used to isolate the vibrating hopper assembly 42 from the conveyor system 40.

Figure 11:
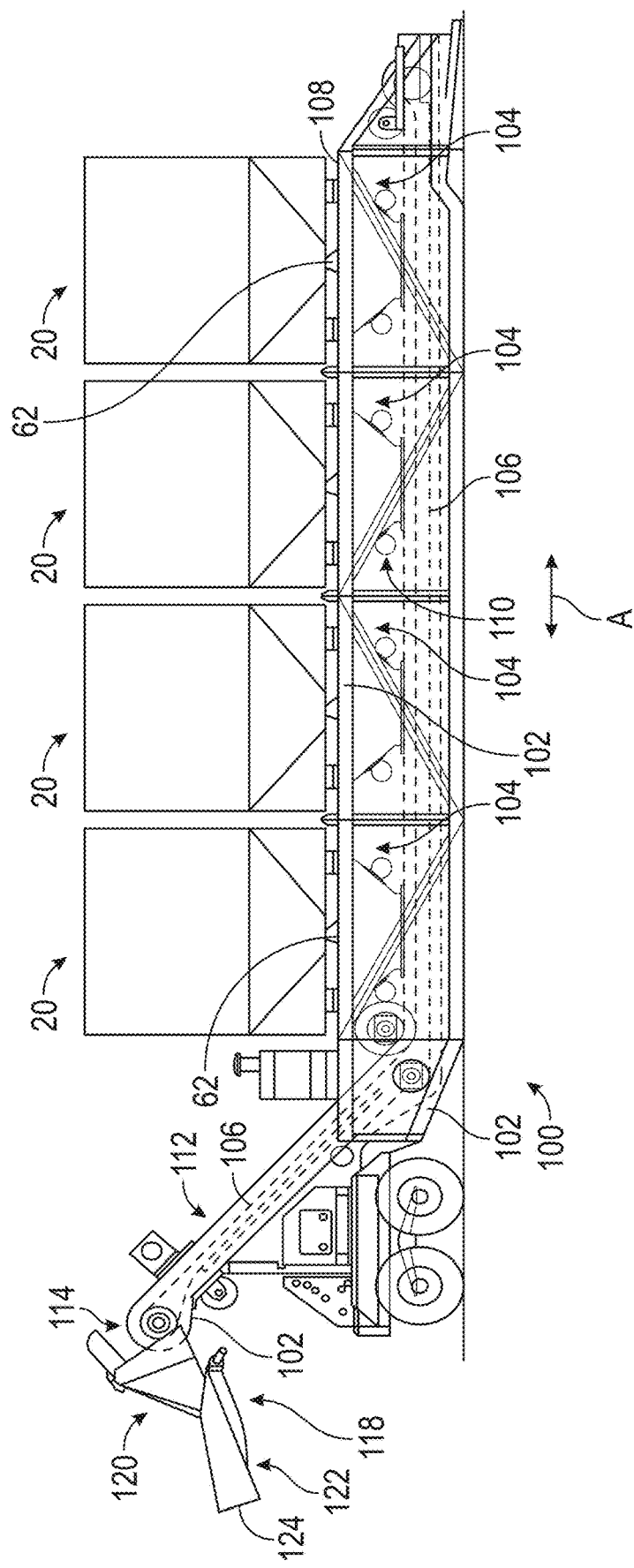
FIG. 11 shows a side elevational view of the material handling/conveyor system in accordance with the present disclosure.
Figure 12:
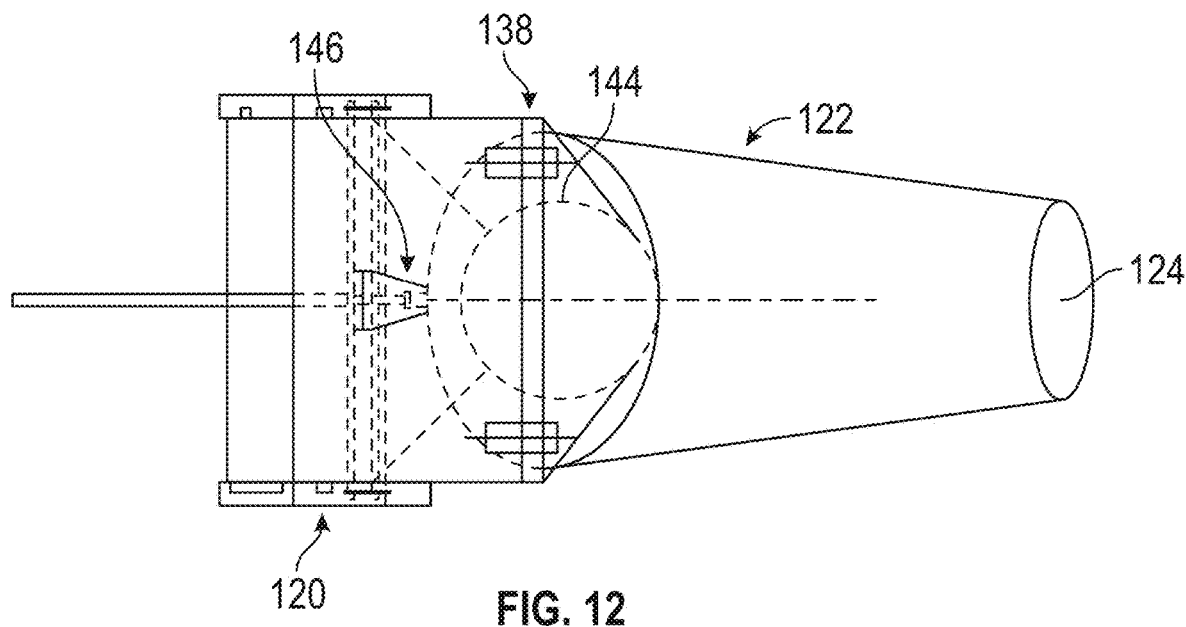
FIG. 12 is a top view of an embodiment of the discharge assembly in accordance with the present disclosure.
Figure 13:
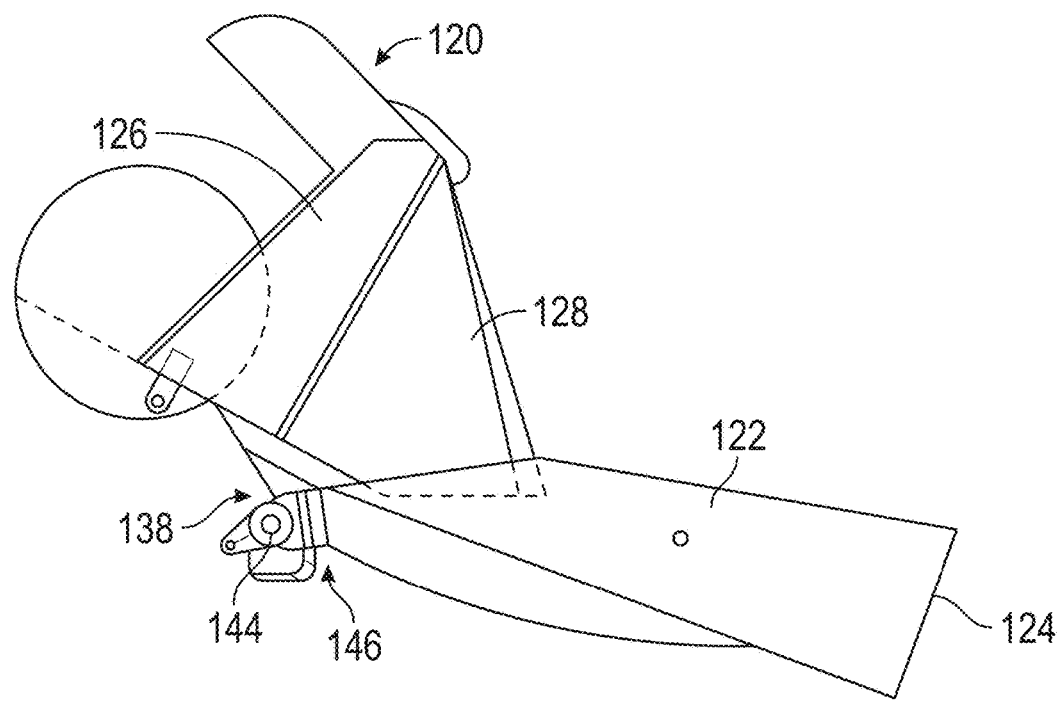
FIGS. 13-15 are side elevational views of the discharge assembly shown in FIG. 12 in various articulated positions in accordance with the present disclosure.
Figure 15:
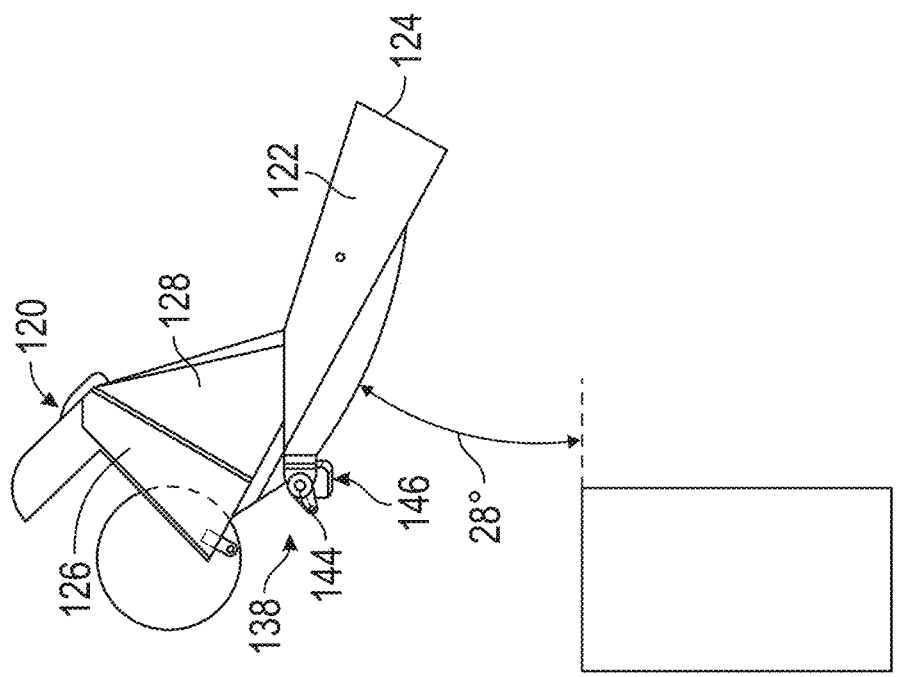
Figure 14:
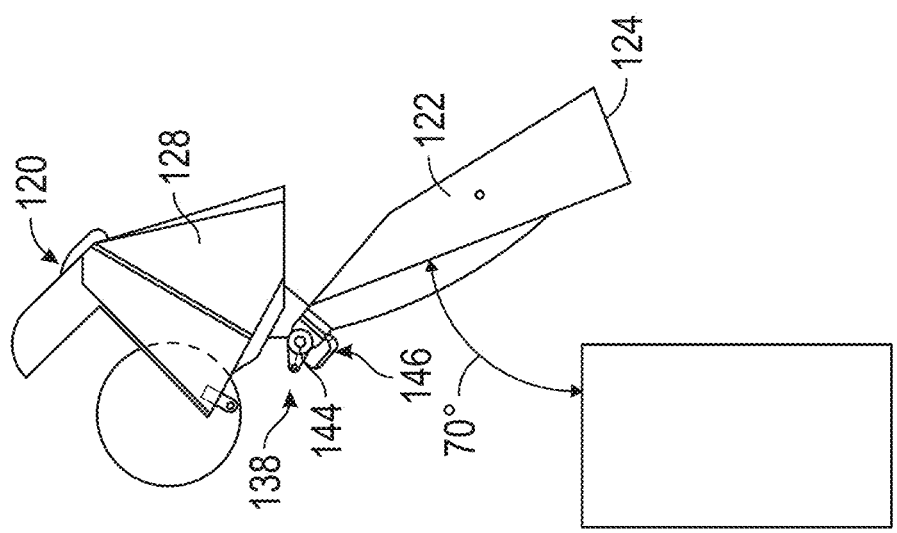
Figure 16:
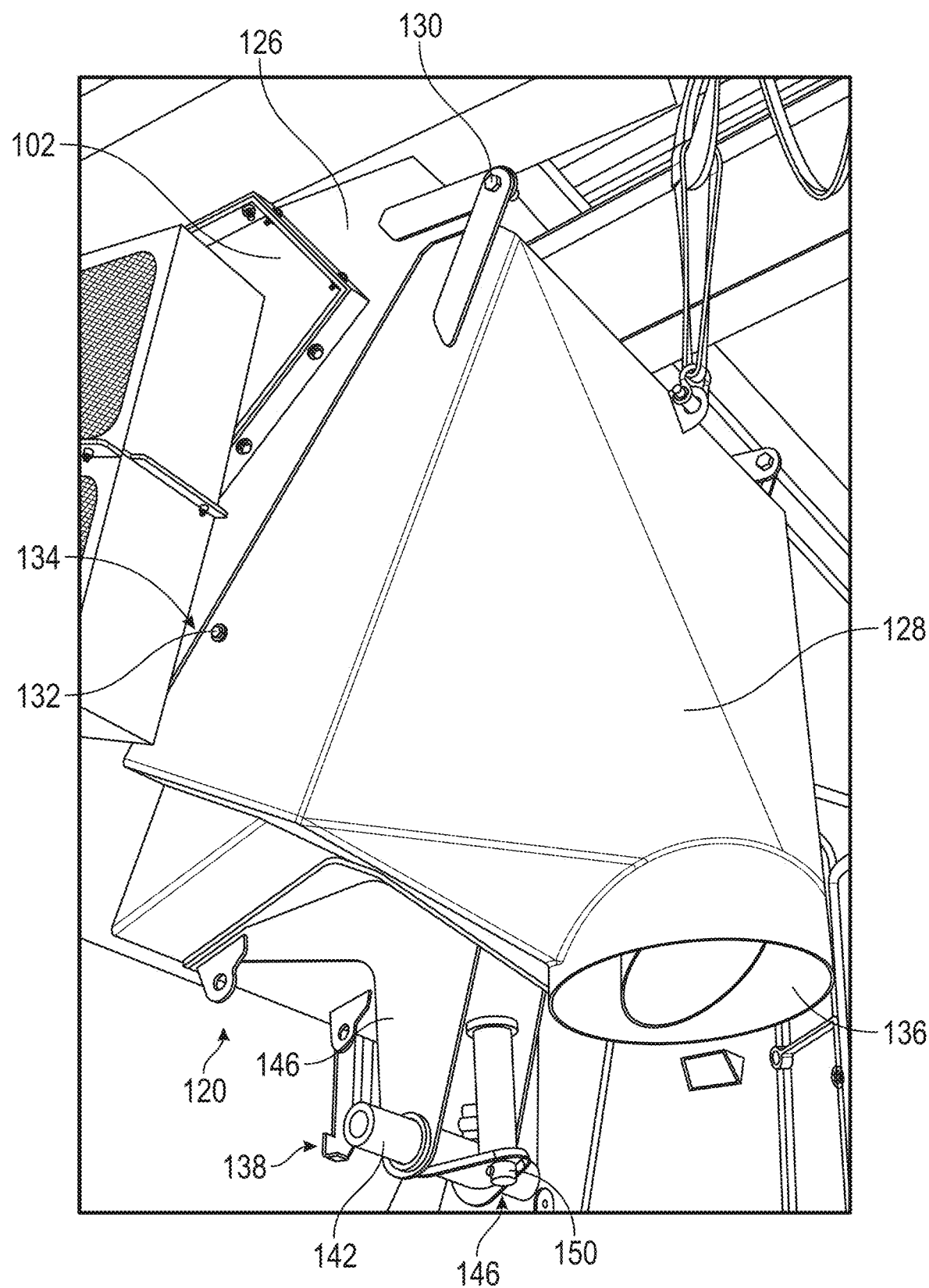
FIG. 16 is a close-up view of the chute shown in FIG. 12 in accordance with the present disclosure.
Figure 17:
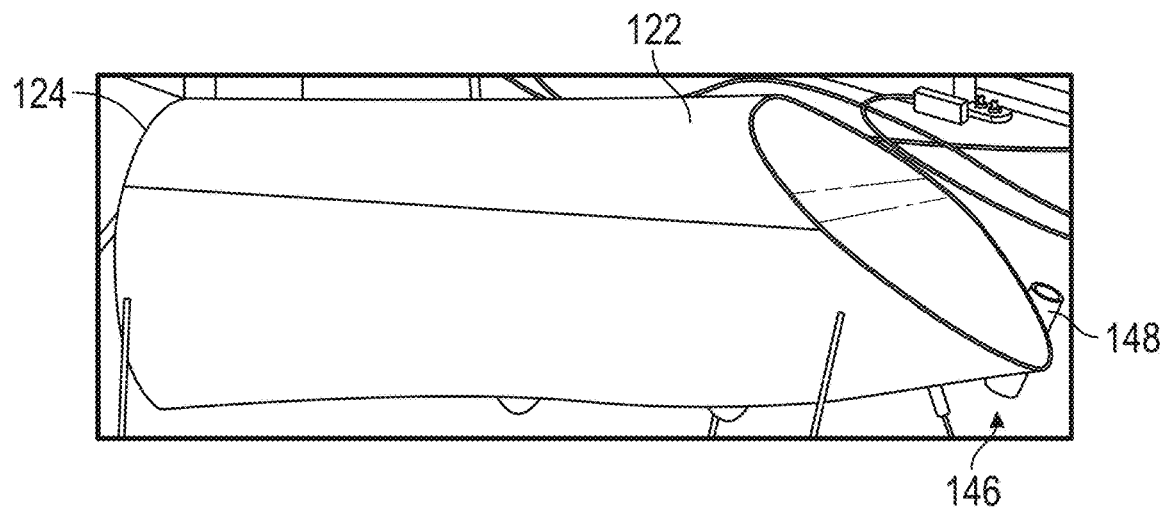
FIG. 17 is a side view of the dragon tail shown in FIG. 12 in accordance with the present disclosure.
Figure 18:
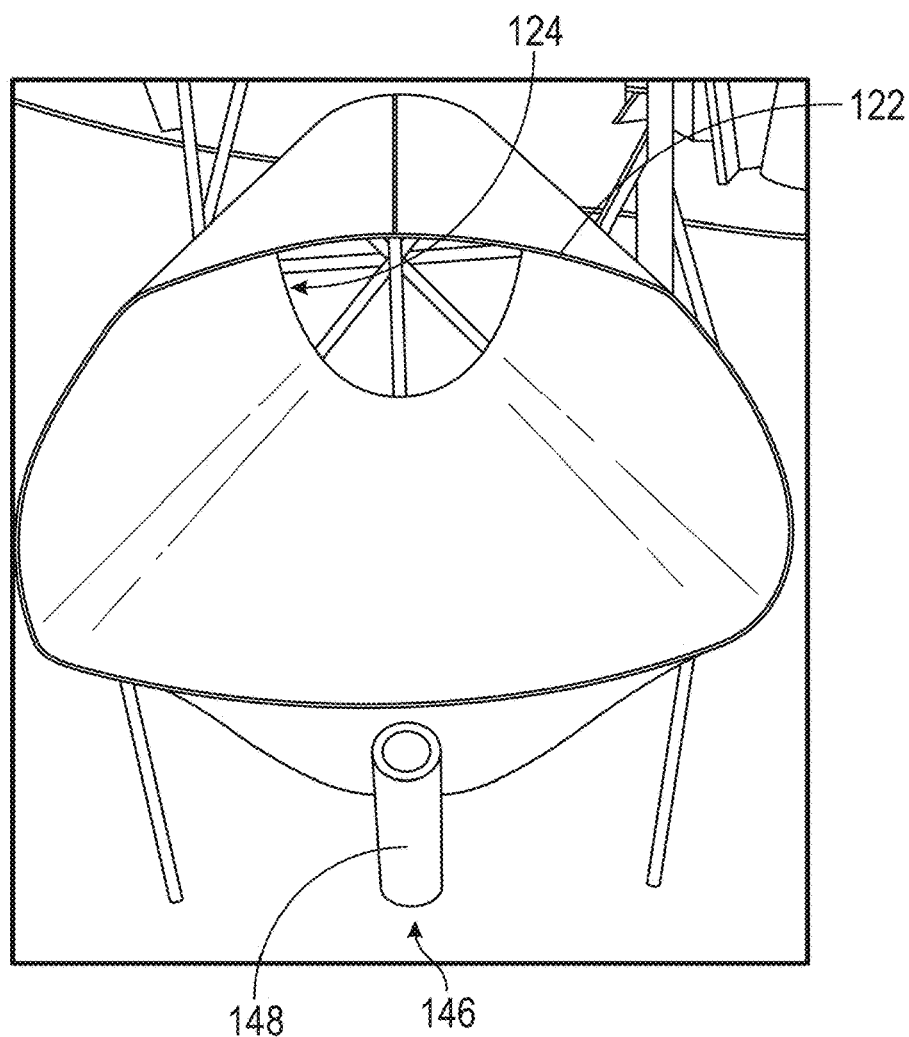
FIG. 18 is an end view of the dragon tail shown in FIG. 12 in accordance with the present disclosure.

FIG. 11 illustrates a material handling/conveyor system 100 in accordance with the present disclosure. The system includes a conveyor support structure 102 for supporting one or more containers 20 in an elevated position above a hopper assembly 104 and a conveyor belt 106. In this embodiment, the system 100 equates with system 40 and hopper assembly 104 equates with hopper assembly 42, as described above. As illustrated, the system 100 includes four identical regions, each region being configured to support a container 20 in an elevated position above the conveyor belt 106.

The system 100 is similar to other material handling/conveyor systems developed by Applicant, such as that disclosed in U.S. Pat. No. 9,771,224. In addition to the details described above with respect to the container 20 and the hopper assembly 42, the material handling/conveyor system 100 is further adapted for transporting and dispensing wet sand. The conveyor support structure 102 has a sufficient length so as to accommodate four containers 20. The conveyor belt 106 is arranged beneath the top surface 108 of the conveyor support structure 102 and below the hopper assemblies 104. The conveyor belt 106 is an endless belt that is suitably wound around sheaves and idlers so as to travel a desired path. Wet sand is discharged from the containers 20, dispensed onto an upper side of the conveyor belt 106 and transported along a horizontal section 110 and an inclined section 112 to a discharge end 114 (also referred to as the turnover point) of the conveyor system 100. A lower side of the conveyor belt 106 returns beneath the upper side of the conveyor belt to an end of the conveyor system 100 opposite the discharge end 114.

A shroud 116 encloses the inclined section 112 of the conveyor belt 106. The length (L) of the shroud 116 and the conveyor belt 106 of the conveyor system 100 may be extended (as compared to conventional systems) so that the discharge end 114 is positioned higher above the ground then a conventional conveyor system. The conveyor support structure 102 may be equipped with a hydraulic lifting mechanism for positioned the system 100 above the ground. For example, the hydraulic lifting mechanism may include a plurality of hydraulic cylinders secured to the conveyor support structure 102. Each cylinder is equipped with a retractable piston directed downwardly and having a footing for engaging the ground. The pistons may be extended from the cylinders to lift the support structure above the ground. For example, the stroke of the piston may provide a lifting range, for example a range of about 30 inches. In this way, the discharge end 114, and thus the outlet 124 of the dragon tail 122, can be located through a range of heights above the ground, thereby accommodating a wide variety of equipment and configurations at the well site.

A discharge assembly 118 is located at the discharge end 114 for directing wet sand from the conveyor belt into a blender tub (not shown). The discharge assembly 118 includes a chute 120 located directly adjacent to the discharge end 114 and a tubular element, referred to as a dragon tail 122, extending from the chute 120 to an outlet 124 for dispensing wet sand into the blender tub. With reference now to FIGS. 11-18, the chute 120 includes a fixed section 126 secured to the conveyor support structure 102 and a hinged section 128 coupled to the fixed section 126 at a pivot hinge 130. A bolt 132 extends from the hinged section 128 through a slot 134 formed in the fixed section 126 for adjusting the pitch of the discharge assembly 118. As shown, the hinged section 128 rotates through about 11° of articulation which corresponds to about 6 inches of fore/aft (or front to back) movement at the chute outlet 136. Wet sand transported to the discharge end 114 is dispensed into the fixed section 126 through the hinged section 128 and out of the chute outlet 136 into the dragon tail 122.

The dragon tail 122 is a generally tubular member, which is coupled to the chute 120 by a first mechanism 138. Specifically, the first mechanism 138 hingedly couples the dragon tail 122 to the hinged section 128 of the chute 120 for adjusting the pitch orientation of the dragon tail 122. As shown, the first mechanism 138 includes a chute bracket 140 extending from the hinged section 128 and supporting a bearing block 142. An axle shaft 144 is supported on the dragon tail 122 and extends through the bearing block 142 to rotatably support the dragon tail 122 from the chute 120. In this configuration, the dragon tail 122 may be rotatably positioned through about 50° of articulation which corresponds to about 54 inches of vertical movement and about 30 inches fore/aft movement at the chute outlet 136. The vertical movement affected by the first mechanism 138 in combination with the vertical movement affected by the hydraulic lifting mechanism provides a wide range of vertical height adjustments, for example a range of about 84 inches or more.

A second mechanism 146 pivotally couples the dragon tail 122 to the hinged section 128 via the first mechanism 138 for adjusting the yaw orientation of the dragon tail 122. As illustrated, the second mechanism 146 includes a knuckle 148 extending from the dragon tail 122. An axle shaft 150 is supported on the first mechanism 138 and extends through the knuckle 148 to rotatably support the dragon tail 122 from the first mechanism 138. In this configuration, the dragon tail 122 may be rotatably positioned through about 50 degrees of articulation to the left or right of center.

With reference again to FIG. 11, the material handling/conveyor system 100 includes a motor-brake mechanism 160 for precisely controlling movement of the conveyor belt 106. The motor portion of the motor-brake mechanism 160 is operational in a forward mode for advancing the conveyor belt 106 in a direction to convey wet sand to the discharge assembly, a neutral mode for allowing the conveyor belt 106 to free wheel, and a reverse mode for backing the conveyor belt 106 in a direction away from the discharge assembly. In the neutral mode, a conveyor belt 106 may roll for about 7 to 10 feet before coming to a stop. The braking portion of the motor-brake mechanism 160 is used to stop the movement of the conveyor belt 106 and includes a brake disk on the motor side of a drive shaft, a brake caliper on the conveyor support structure, and a brake controller for activating the brake. In one mode, the brake controller may be a mechanical-hydraulic actuator controlled with an electric solenoid, which is configured as a stop circuit for immediately stopping the conveyor belt 106. In response to a "stop belt" command, the brake controller shifts the motor into neutral mode and causes the caliper to engage the brake disk for immediately stopping the conveyor belt 106. The braking system may also be configured for use in a normal shutdown operation of the conveyor system 100.

The control system for the material handling/conveyor system may be configured to accurately transport wet sand from the containers 20 through the conveyor system 100 and into the blending hopper. In particular, the control system (for example, Lime Instruments Controller connected via RJ45 connectors) operates slide gates on the container 20 and flow gates on the hopper assemblies 42 in combination with the speed of the conveyor belt 106 based on the blender tub feed rate measured by a densometer located clean (suction) side of the blender tub. The densometer measures the specific gravity of blender feed, which can be used to determine the weight of the wet sand being feed into the blender tub. The weight of the wet sand in the container may be measured by a set of box scales on the conveyor structure and may also be used as a feedback parameter for controlling the slide gate on the container 20 and/or the flow gate on the hopper assembly 42. As an option, a moisture content sensor may be locating inside of the hopper 44 to determine the moisture content of the wet sand discharged onto the conveyor belt 106.

The material handling/conveyor system 100 may be configured with a vision subsystem to visually monitor the state and operational status of the system. The vision subsystem includes a camera assembly including weatherproof cameras electrically coupled to the power supply system and configured to capture and wirelessly transmit live video from a low light scene to a remote display. For example, individual cameras may be located and aimed for monitoring the slide gates for each of the containers 20, the flow gates for each of the hopper assemblies 42, and the discharge from the dragon tail 122 into the blender tub.

The material handling/conveyor system 100 includes an on-board power unit 162 for supplying electrical power and hydraulic power to the various motors, actuators, sensors, controllers, cameras, etc. The on-board power unit includes a diesel engine operably coupled to hydraulic pump(s) and electrical alternator(s). As a back-up function, an off-board (i.e., separate) power unit 164 may be configured on a portable skid that can be located adjacent to the on-board power unit 162. The off-board power unit 164 is simply plumbed and wired into the system 100 as a redundant or replacement power unit.

Figure 19:
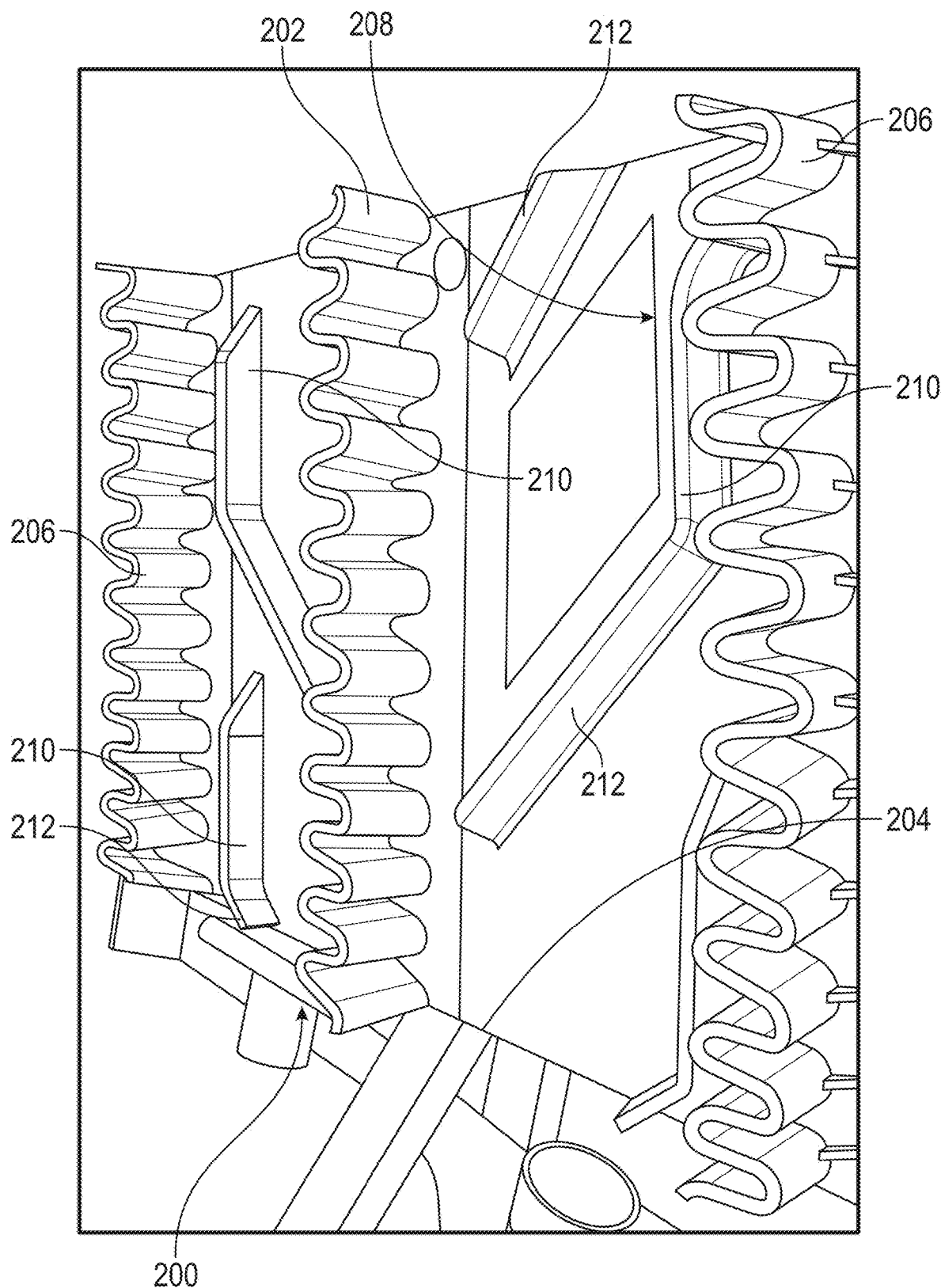
FIG. 19 shows a portion of the conveyor belt for the material handling/conveyor system in accordance with the present disclosure.

FIG. 19 illustrates a section of a suitable conveyor belt 200 for transporting wet sand. The conveyor belt 200 includes a corrugated central rib 202 extending from the belt surface 204 between the corrugated side walls 206 of the conveyor belt 200. While the height of the central rib 202 is illustrated as being the same as the corrugated side walls 206, it may also be shorter in height, for example the same height as the paddles 208 shown in FIG. 19. Paddles 208 include an axial portion 210 and an angular portion 212 for transporting wet send. The paddles 208 extending up from the belt surface have a lower profile as compared to partitions formed in a conventional belt.

Figure 20:
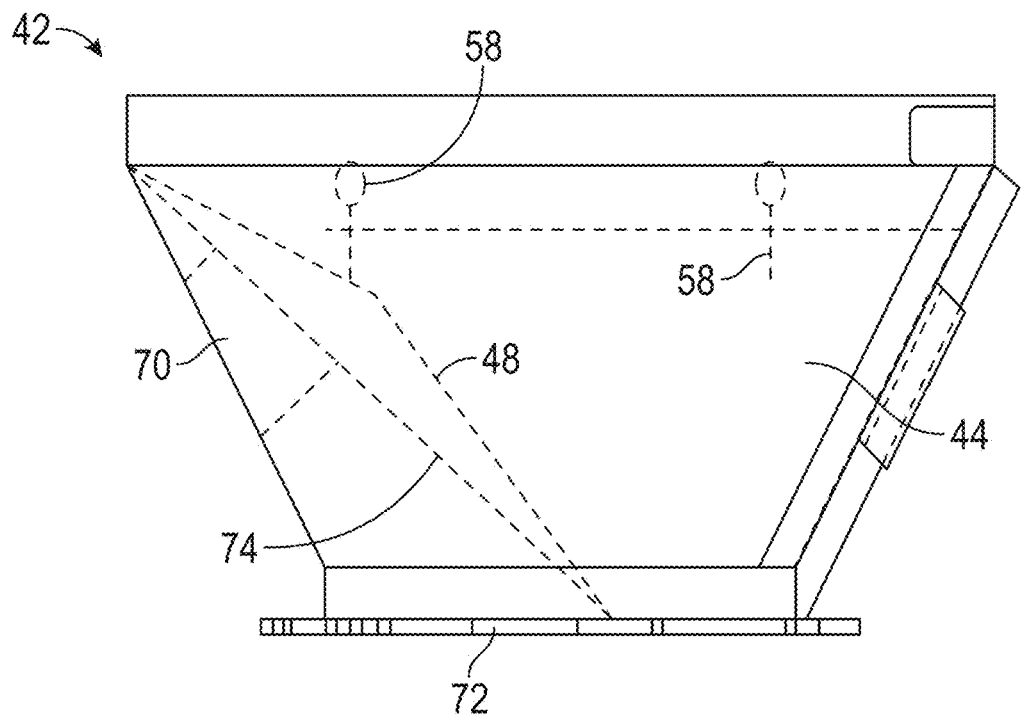
FIG. 20 is a front view of the hopper assembly in accordance with the present disclosure.
Figure 21:
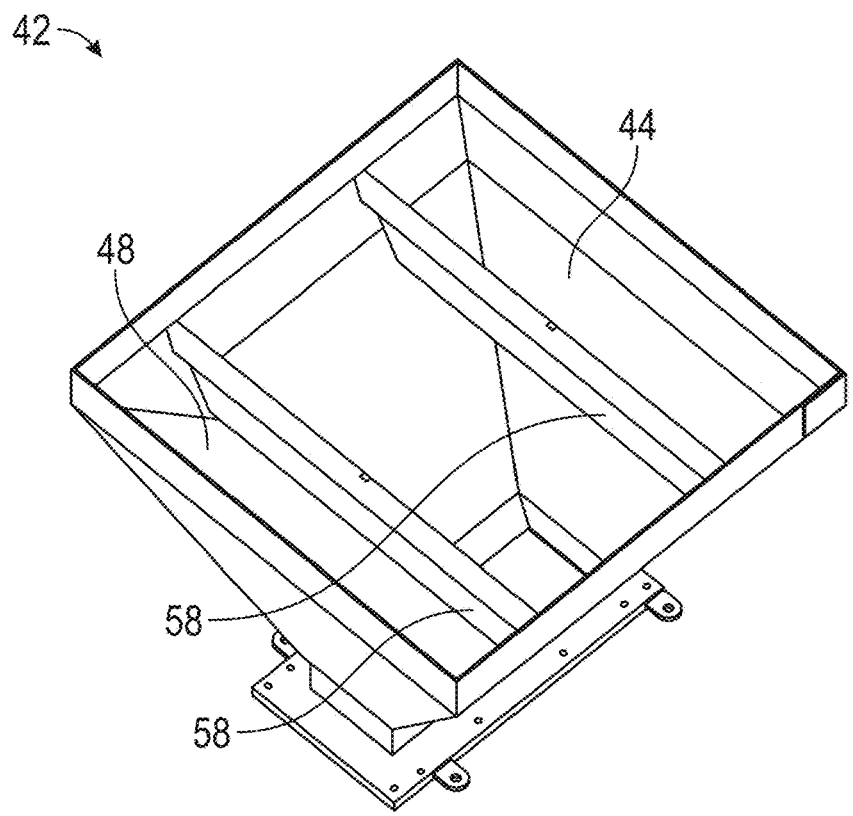
FIG. 21 is a top, perspective view of the hopper assembly in accordance with the present disclosure.

FIG. 20 depicts another embodiment of the hopper assembly 42 showing the hopper 44, flat bars 58 positioned at the bottoms of pipes for strength, and a bracing 70. In one or more embodiments, the bracing 70 is positioned between panels in the hopper 44. The one or more vibration mechanisms (not shown) may be installed to an exterior surface of the of the hopper 44 and connected directly to the bracing 70 for a stronger overall mount. In addition, the embodiment illustrated in FIG. 20 shows a modification of the interior wall 48, where the interior wall 48 is sloped to better guide the wet sand into the outlet of the hopper 44. Moreover, as shown interior wall 48 includes a plurality of sections, each section having a distinct slope. Upper section of interior wall 48 is at an angle (from the horizontal plane) that is less than a lower section of interior wall 48. An aggregate angle, formed between the horizontal plane 72 and a plane 74 extending from a top edge of interior wall 48 to a bottom edge of interior wall 48 may be less than 85 degrees, such as from 20 degrees to less than 85 degrees, or a lower limit of any of 20, 30, or 40 degrees to an upper limit of any of 60, 75, or 85 degrees, where any lower limit can be used in combination with any upper limit. Moreover, an angle, formed between the horizontal plane 72 and the lower section of interior wall 48 may be greater than the aggregate angle, but less than 90 degrees, such as from 20 degrees to less than 90 degrees, or a lower limit of any of 20, 30, or 40 degrees to an upper limit of any of 60, 75, or 90 degrees, where any lower limit can be used in combination with any upper limit. As a result, interior wall 48 extends from the top of the hopper 44 at a shallower angle than left wall 52, as best seen in FIG. 20. FIG. 21 illustrates a top, perspective view of the hopper assembly 42 in FIG. 20.

Figure 22:
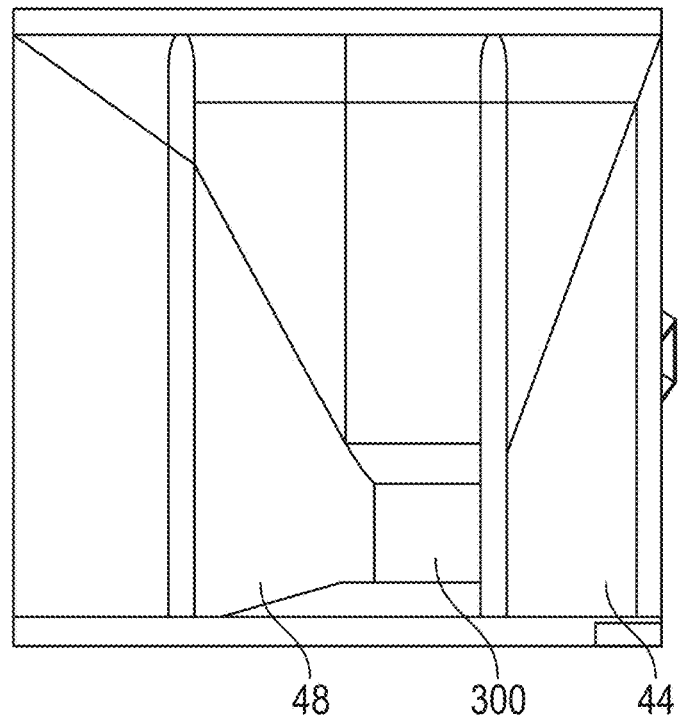
FIG. 22 is a top view of the hopper assembly in accordance with the present disclosure.
Figure 23:
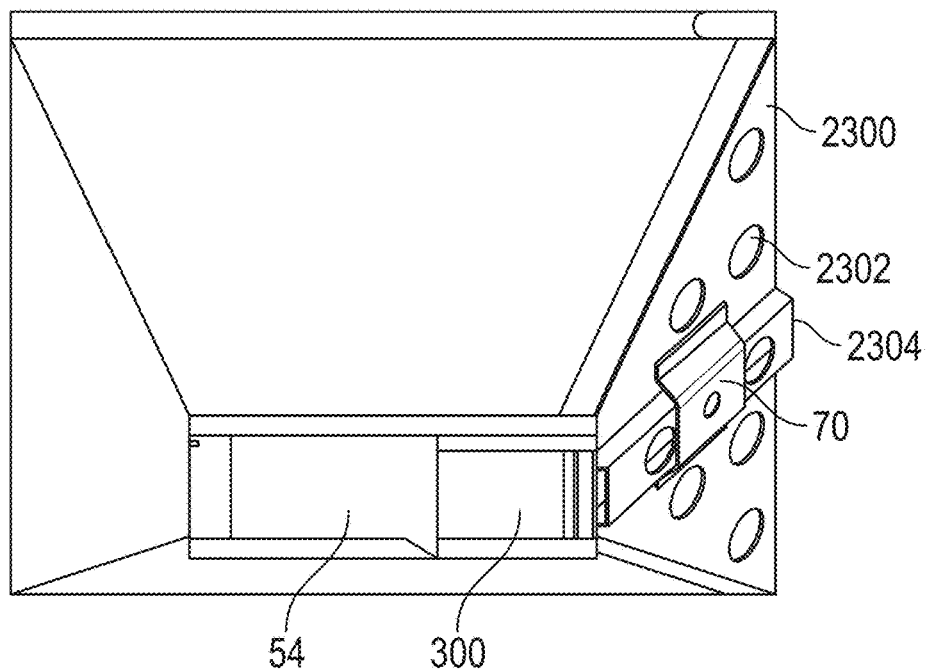
FIG. 23 is a bottom view of the hopper assembly in accordance with the present disclosure.

FIG. 22 shows a top view of the hopper assembly 42 in FIG. 20. As shown in FIG. 22, the outlet 300 of the hopper 44 has an area that is made smaller due to the angle of the interior wall 48 and lacks a grate or screen. The position and slope of the interior wall 48 ensures that the area of the outlet 300 relative to the area of the inlet 310 is reduced compared to a hopper assembly lacking the interior wall 48. FIG. 23 illustrates a bottom view of the hopper assembly 42. As described above, the flow gate 54 is configured over the outlet 300. Also visible is bracing 70, which is attached with a side of the hopper assembly 42 and provides a mount for a vibration device (not shown). In one or more embodiments, the hopper assembly is reinforced (via welding) with a plate 2300 of a thicker gauge material than the rest of the hopper to allow the hopper to withstand vibratory forces produced by a vibration device. The plate 2300 may include holes 2302 therein to increase the surface area for attaching the plate 2300 to the hopper assembly 42. Additionally, as shown, the hopper assembly 42 includes a supporting element 2304, or C-channel, which is seam of a thicker gauge material welded onto the plate 2300. The supporting element 2304 serves to assist in dispersing vibration throughout the entire length of the hopper 44.

Figure 24:
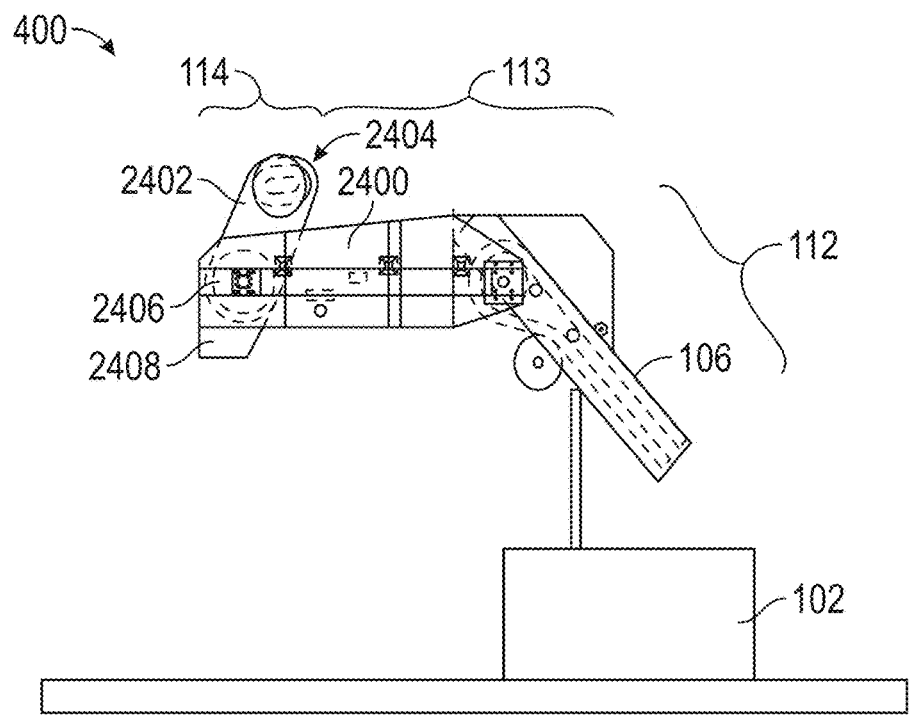
FIG. 24 is a side elevational view of the material handling/conveyor system in accordance with the present disclosure.

FIG. 24 shows a material handling/conveyor system 400 in accordance with the present disclosure. Similar to the embodiment illustrated in FIG. 11, material handling/conveyor system 400 receives sand from one or more containers (not shown). Conveyer belt 106 receives sand below each container. The conveyor belt 106 is an endless belt that is suitably wound around sheaves and idlers so as to travel a desired path. Wet sand is discharged from the containers (not shown), dispensed onto an upper side of the conveyor belt 106 and transported along a first horizontal section (not shown), an inclined section 112, and a second horizontal section 113 before reaching a discharge end (also referred to as the turnover point) of the conveyor system 400. A lower side of the conveyor belt 106 returns beneath the upper side of the conveyor belt to an end of the conveyor systems 100 opposite the discharge end 114. Sand is carried on conveyor belt 106 away from the containers (not shown), up the inclined section 112, and then along second horizontal section 113, such that sand can fall off of the conveyor system 400 (into blender tub (not shown)).

In some embodiments, the material handling/conveyor system may include an elongated horizontal structure, referred to as a stinger 2400, which is connected with the inclined section 112 to move sand a further distance away from the conveyor support structure 102, containers (not shown), and/or the first horizontal section (not shown) of conveyor belt 106. The stinger 2400 mechanically bridges the gap between the conveyor support structure 102 containers (not shown) and/or the first horizontal section (not shown) on the one hand and the blender tub (not shown) on the other. A chain structure 2402 connected with the stinger 2400 connects a motor 2404 and a tailwheel 2406 to mechanically move the sand such that the sand may be thrown from the discharge end 114 similar to that described for the embodiment depicted in FIG. 11. A chute structure 2408 connected with the stinger 2400 directs the sand to the blender tub (not shown). However, it may be understood that the embodiment illustrated in FIG. 24, with the inclusion of the stinger to bridge the gap, sand may fall off the discharge end and into the blender tub optionally by gravity alone.

Figure 25:
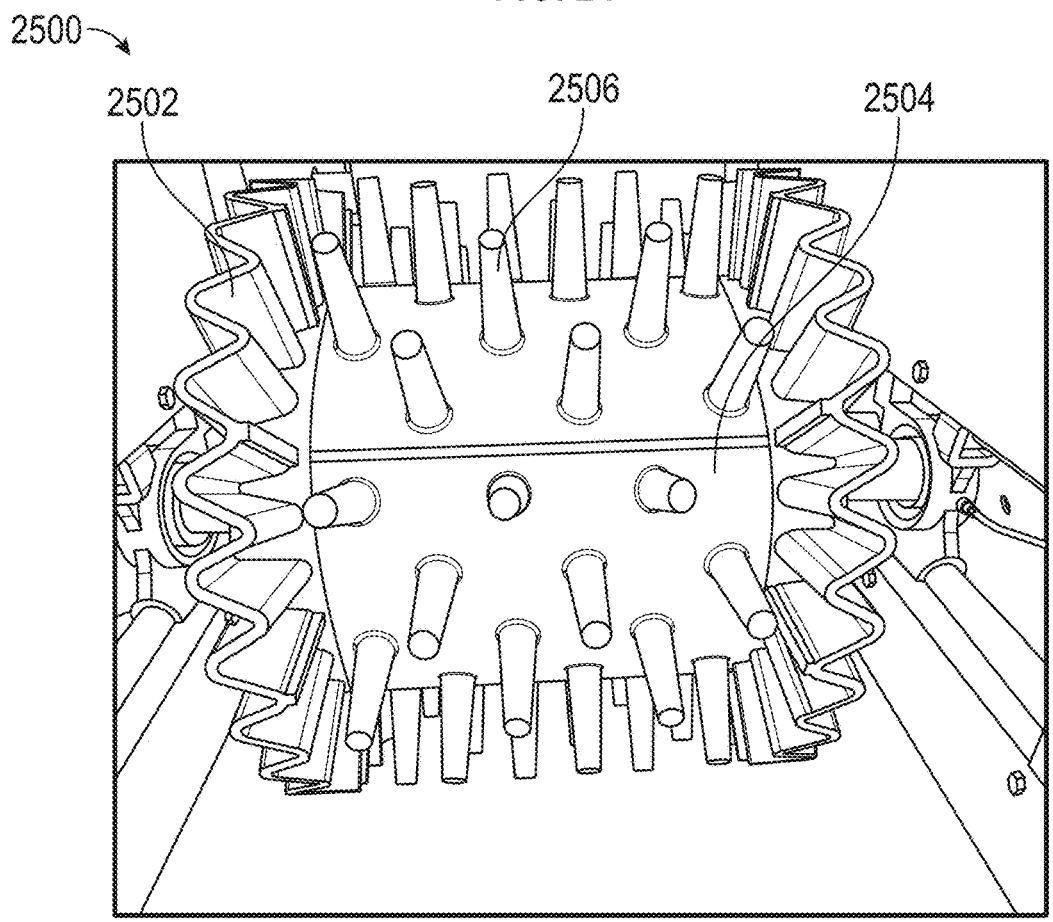
FIG. 25 shows a portion of the conveyor belt for the material handling/conveyor system in accordance with the present disclosure.

FIG. 25 illustrates a portion of an additional embodiment of a conveyor belt 2500 for transporting wet sand. The conveyor belt 2500 includes corrugated side walls 2502 on either side of the belt surface 2504. The corrugated side walls 2502 serve to keep the sand from falling off the conveyor belt 2500 during use. In addition to the corrugated side walls 2502, the conveyor belt 2500 includes a plurality of tubular projections 2506 extending from the belt surface 2504 between the corrugated side walls 2502. In one or more embodiments, the corrugated side walls 2502 are about two inches thick and extend about 4.5 inches in height from the belt surface 2504. In some embodiments, the tubular projections 2506 (or nubs) are comprised of a flexible material, such as rubber, and extend approximately 4.5 inches in height from the belt surface 2504. The tubular projections 2506 function to assist in breaking up any clumps of the wet sand that falls to the conveyor belt 2500.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

The invention claimed is:

1. A system for conveying wet sand, the system comprising:
a plurality of containers having wet sand stored therein, each of the containers comprising:
a plurality of side walls forming the container;
an interior surface having a slip coating thereon;
a bottom portion for storing the wet sand, the bottom portion having an outlet formed therein to facilitate removal of the wet sand from the container; and
a top portion terminating at the plurality of side walls and forming an inlet to the interior surface;
a conveyor system comprising:
a conveyor belt, the conveyor belt formed to receive wet sand and carry the wet sand away from the conveyor system;
a conveyor support structure;
a hopper assembly, comprising:
a hopper comprising a pair of end walls, a pair of side walls, an interior wall extending from a top of the hopper to a bottom of the hopper, and an outlet, wherein the hopper receives the wet sand from one or more of the plurality of containers,
wherein the interior wall extends at an angle such that an area of the outlet is reduced;
a flow gate configured over the outlet and movable in a direction for controlling discharge of wet sand from the hopper onto the conveyor belt,
upper supports extending across a top of the hopper between the pair of end walls, and
a gate actuator supported on the upper supports, the gate actuator comprising a pair of pickle forks extending upwardly for engaging and selectively positioning a slide gate on an adjacent container positioned over the hopper assembly;
one or more vibration systems coupled to an exterior surface of the hopper assembly for generating a shaking force that is transmitted to the hopper assembly; and
a discharge assembly located at an end of the conveyor system for directing the wet sand from the conveyor belt.

2. The system of claim 1, wherein the discharge assembly comprises:
a chute having a chute outlet; and
a tubular element extending from the chute to an outlet for dispensing the wet sand, the tubular element formed to receive the wet sand from the chute outlet.

3. The system of claim 1, wherein the slip coating is a flexible sheet product secured to the interior surface.

4. The system of claim 1, wherein the slip coating is a liquid applied to the interior surface.

5. The system of claim 1, wherein the hopper assembly comprises an interior surface having a slip coating thereon.

6. The system of claim 1, wherein the flow gate is movable in a direction parallel to a travel path of the conveyor belt.

7. The system of claim 1, wherein the conveyor system further comprises a supporting element attached with a bottom of each upper support.

8. The system of claim 7, further comprising one or more bump stops installed on the pair of pickle forks.

9. The system of claim 2, wherein the chute comprises a fixed section secured to the conveyor support structure and a hinged section pivotally coupled to the fixed section and formed to adjust a pitch of the discharge assembly.

10. The system of claim 9, wherein the tubular element is coupled to the chute by a first mechanism and a second mechanism, wherein the first mechanism provides a pitching movement of the tubular element with respect to the chute, and wherein the second mechanism provides a yawing movement of the tubular element with respect to the chute.

11. The system of claim 10, wherein the first mechanism comprises a chute bracket extending from the hinged section and supporting a bearing block.

12. The system of claim 11, further comprising a first axle shaft supported on the tubular element and extending through the bearing block for rotatably supporting the tubular element from the chute.

13. The system of claim 12, wherein the second mechanism comprises a knuckle extending from the tubular element, wherein a second axle shaft is supported on the first mechanism and extends through the knuckle for rotatably supporting the tubular element from the first mechanism.

14. The system of claim 1, wherein at least one vibration system comprises a motor assembly secured to an end wall of the hopper, and wherein a bracing extends between the end wall and the interior wall for reinforcing the motor assembly.

15. The system of claim 14, wherein the at least one vibration system is connected directly to the bracing.

16. The system of claim 1, further comprising an elongated horizontal structure extending from an inclined section of the conveyor system to move the wet sand to the discharge assembly.

17. The system of claim 16, wherein the elongated horizontal structure is connected with a chain structure connecting a motor and a tailwheel to mechanically move the wet sand from the elongated horizontal structure.

18. A system for conveying wet sand, the system comprising:
a plurality of containers having wet sand stored therein, each of the containers comprising:
a plurality of side walls forming the container;
an interior surface having a slip coating thereon;
a bottom portion for storing the wet sand, the bottom portion having an outlet formed therein to facilitate removal of the wet sand from the container; and
a top portion terminating at the plurality of side walls and forming an inlet to the interior surface;
a conveyor system comprising:
a conveyor belt, the conveyor belt formed to receive wet sand and carry the wet sand away from the conveyor system;
a conveyor support structure;
a hopper assembly, comprising:
a hopper comprising a pair of end walls, a pair of side walls, an interior wall extending from a top of the hopper to a bottom of the hopper, and an outlet, wherein the hopper receives the wet sand from one or more of the plurality of containers,
wherein the interior wall extends at an angle such that an area of the outlet is reduced;
a flow gate configured over the outlet and movable in a direction for controlling discharge of wet sand from the hopper onto the conveyor belt
one or more vibration systems coupled to an exterior surface of the hopper assembly for generating a shaking force that is transmitted to the hopper assembly; and
a discharge assembly located at an end of the conveyor system for directing the wet sand from the conveyor belt;
wherein the conveyor belt comprises a corrugated central rib and corrugated side walls, wherein the corrugated central rib extends from a belt surface between the corrugated side walls.

19. The system of claim 18, wherein a height of the corrugated central rib is less than a height of the corrugated side walls.

20. A system for conveying wet sand, the system comprising:
a plurality of containers having wet sand stored therein, each of the containers comprising:
a plurality of side walls forming the container;
an interior surface having a slip coating thereon;
a bottom portion for storing the wet sand, the bottom portion having an outlet formed therein to facilitate removal of the wet sand from the container; and
a top portion terminating at the plurality of side walls and forming an inlet to the interior surface;
a conveyor system comprising:
a conveyor belt, the conveyor belt formed to receive wet sand and carry the wet sand away from the conveyor system;
a conveyor support structure;
a hopper assembly, comprising:
a hopper comprising a pair of end walls, a pair of side walls, an interior wall extending from a top of the hopper to a bottom of the hopper, and an outlet, wherein the hopper receives the wet sand from one or more of the plurality of containers,
wherein the interior wall extends at an angle such that an area of the outlet is reduced;
a flow gate configured over the outlet and movable in a direction for controlling discharge of wet sand from the hopper onto the conveyor belt
one or more vibration systems coupled to an exterior surface of the hopper assembly for generating a shaking force that is transmitted to the hopper assembly; and
a discharge assembly located at an end of the conveyor system for directing the wet sand from the conveyor belt;
wherein the conveyor support structure is equipped with a hydraulic lifting mechanism configured for increasing a height of the conveyor system.

21. A system for conveying wet sand, the system comprising:
a plurality of containers having wet sand stored therein, each of the containers comprising:
a plurality of side walls forming the container;
an interior surface having a slip coating thereon;
a bottom portion for storing the wet sand, the bottom portion having an outlet formed therein to facilitate removal of the wet sand from the container; and
a top portion terminating at the plurality of side walls and forming an inlet to the interior surface;
a conveyor system comprising:
a conveyor belt, the conveyor belt formed to receive wet sand and carry the wet sand away from the conveyor system;
a conveyor support structure;
a hopper assembly, comprising:
a hopper comprising a pair of end walls, a pair of side walls, an interior wall extending from a top of the hopper to a bottom of the hopper, and an outlet, wherein the hopper receives the wet sand from one or more of the plurality of containers,
wherein the interior wall extends at an angle such that an area of the outlet is reduced;
a flow gate configured over the outlet and movable in a direction for controlling discharge of wet sand from the hopper onto the conveyor belt;
one or more vibration systems coupled to an exterior surface of the hopper assembly for generating a shaking force that is transmitted to the hopper assembly; and
a discharge assembly located at an end of the conveyor system for directing the wet sand from the conveyor belt;
wherein the discharge assembly comprises:
a chute having a chute outlet; and
a tubular element extending from the chute to an outlet for dispensing the wet sand, the tubular element formed to receive the wet sand from the chute outlet;
wherein the chute comprises a fixed section secured to the conveyor support structure and a hinged section pivotally coupled to the fixed section and formed to adjust a pitch of the discharge assembly
wherein the tubular element is coupled to the chute by a first mechanism and a second mechanism, wherein the first mechanism provides a pitching movement of the tubular element with respect to the chute, and wherein the second mechanism provides a yawing movement of the tubular element with respect to the chute.

* * * * *